United States Patent [19]

Tien

[11] Patent Number: 4,713,140
[45] Date of Patent: Dec. 15, 1987

[54] LASER LUMINESCENCE MONITOR FOR MATERIAL THICKNESS

[75] Inventor: Zu-Jean Tien, Poughkeepsie, N.Y.

[73] Assignee: International Business Machines Corporation, Armonk, N.Y.

[21] Appl. No.: 20,402

[22] Filed: Mar. 2, 1987

[51] Int. Cl.$^4$ .................. H01L 21/306; B44C 1/22; B05D 3/06; B05C 11/00

[52] U.S. Cl. .................. 156/626; 118/712; 156/643; 156/655; 156/662; 156/345; 204/192.13; 204/192.33; 204/298; 427/10; 356/381

[58] Field of Search ............... 156/626, 627, 643, 646, 156/655, 659.1, 662, 345; 118/712; 427/8–10, 38, 39, 87; 356/381, 400, 437; 204/192.12, 192.13, 192.25, 192.32, 192.33, 192.35, 298

[56] References Cited

U.S. PATENT DOCUMENTS

| 4,285,763 | 8/1981 | Coldren ......................... | 156/643 |
| 4,289,188 | 9/1981 | Mizutani et al. ............... | 156/626 |
| 4,328,068 | 5/1982 | Curtis .......................... | 156/626 |
| 4,377,436 | 3/1983 | Donnelly et al. .............. | 156/626 |
| 4,394,237 | 7/1983 | Donnelly ....................... | 204/192 |
| 4,415,402 | 11/1983 | Gelernt et al. ................ | 156/626 |
| 4,430,151 | 2/1984 | Tsukada ........................ | 156/626 |
| 4,491,499 | 1/1985 | Jerde et al. ................... | 156/626 |
| 4,493,745 | 1/1985 | Chen et al. .................... | 156/626 |

FOREIGN PATENT DOCUMENTS 0081785  6/1983  European Pat. Off. .

OTHER PUBLICATIONS

J. of Luminescence 7(1973) 284–309, North Holland Publishing Co.
Appl. Phys. Lett. 34(12), Jun. 15, 1979 American Institute of Physics.
Appl. Phys. Lett. 33(7), Oct. 1, 1978 American Institute of Physics.
J. Appl. Phys. 54(3), Mar. 1983 American Institute of Physics.
J. Appl. Phys. 54(10), Oct. 1983 American Institute of Physics.
IBM T. J. Watson Research Center Knoedler & Kuech The Reactive Ion Etching of $Al_xGa_{1-x}As$ in $CCl_2F_2$.
Jap. J. of Applied Physics vol. 20, No. 11, Nov. 1981, pp. 1847–1850.
J. Vac. Sci. Technol. B 3(1), Jan./Feb. 1985.
J. Vac. Sci. Technol., 21(3), Sep./Oct. 1982.
Appl. Phys. Lett. 45(4), Aug. 15, 1984.
Technical Notes P. 214–215, vol. 131, No. 1.
Amn. Rev. Phys. Chem. 1977, 28: 349–372.
Materials Research Society Symposia Proceedings vol. 17 3rd Int'l. Symposium on Dry Etching, B. H. Desilets–R. S. Bennett.

Primary Examiner—William A. Powell
Attorney, Agent, or Firm—William T. Ellis

[57] ABSTRACT

An apparatus and method for monitoring a change of thickness of a first material with a first bandgap energy, for disposal over a second material on a wafer and having a second different bandgap energy, wherein at least one of the materials has a direct bandgap. The apparatus comprises means for changing the thickness of the first material layer; means for directing a beam of energy to impinge at an angle on to the surface and to penetrate the wafer, with the beam having an energy sufficient to pump the at least one direct bandgap material to a higher energy state; and means for detecting the induced luminescence from the at least one direct bandgap material to determine when to alter the thickness changing process.

The present invention may be used to monitor both deposition and etching processes. It is particularly suited for determining the etch endpoint for III-V semiconductor materials such as GaAs and AlGaAs.

39 Claims, 1 Drawing Figure

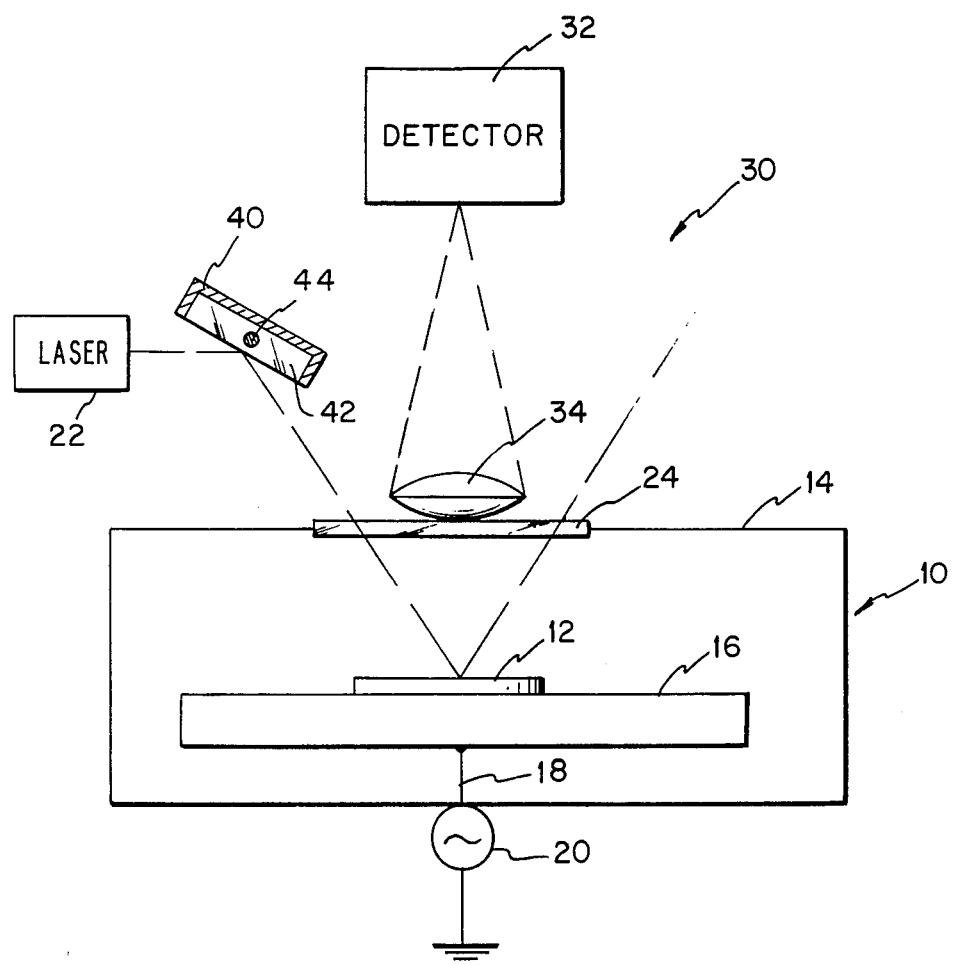

LASER LUMINESCENCE MONITOR FOR MATERIAL THICKNESS

BACKGROUND OF THE INVENTION

The present invention relates generally to a means and a method for processing semiconductor and other materials, and more particularly, to a means and a method for monitoring the change in thickness of a thin material layer during a thickness-changing operation.

There are a variety of apparatus and methods available for changing the thickness of a given material, including deposition techniques for increasing the thickness from a zero base to some desired thickness, and etching and ion-milling techniques for reducing the thickness to some desired level or completely removing the material at a particular location. In semiconductor device processing, the ability to monitor the thickness during such a thickness-changing operation is frequently critical because of the very small dimensions and tolerances involved. Such monitoring is essential in order to control and/or stop the thickness-changing process at a desired thickness of the material.

For example, with reference to material thickness reduction, reactive ion etching or plasma etching is now typically used to delineate fine line patterns and trenches in thin films of either insulators, semiconductors, or metals by means of the removal of portions of these films in a plasma discharge. The wafer to be etched is placed in a plasma chamber into which a gas mixture is directed at a reduced pressure. In the presence of a plasma discharge generated by the application of RF energy, reactive species are generated from the feed gas by processes such as dissociative or impact ionization. Portions of the thin film are removed by chemical reaction between the reactive species and the film, as well as by bombardment of the film by ions present in the plasma. The gaseous reaction products formed by the chemical reactions and the ion bombardment of the film are continuously removed from the chamber using a vacuum pump.

One of the problems encountered in the use of reactive ion etching is the insufficient reproducibility of the etching rate. In part, this etch reproducibility problem is caused by variations in the plasma composition due to the time dependent presence of etch products, difficulties in completely controlling the surface temperature of the wafer or wafers to be etched, and batch-to-batch variation in the quantity of material to be etched, or the load. Because of this variation in the etching rate, reactive ion etching requires monitoring to detect the completion of the etching process. In this regard, it is important to detect the end of the etching process in order to terminate the etch before over-etching occurs in the sublayer below the layer being etched. Such over-etching is detrimental not only because it attacks the substrate or sublayer below the layer being etched, but also because it causes undercutting of the etch pattern, thereby altering the dimensions of the desired features in the etched layer.

In one endpoint detection scheme, a majority chemical species from the layer being etched enters the etching plasma and is observed by monitoring a relevant spectral line for that majority species as the etching process consumes the layer being etched. The time to terminate the process is inferred from changes in the intensity of this monitored majority species spectral line. However, when the composition of the etched layer and its sublayer therebelow are similar or the same, then monitoring of the majority species from the etched layer will not provide a determination of the etch endpoint. A similar problem is encountered when techniques are utilized to compensate for etch loading non-uniformities. For example, an aluminum film on a wafer is many times etched by disposing the wafer on a high purity aluminum target to thereby prevent a sudden large excess of etching species near the end of the etch process which would cause an attendant undercutting of the aluminum film. However, the use of this aluminum target prevents the determination of the etch endpoint by monitoring the majority aluminum species.

This problem is especially acute for the etching of GaAs down to a layer of AlGaAs. Optical emission or laser induced fluorescence of atomic aluminum present in the etching plasma is not sensitive enough to detect the subtle aluminum concentration change as the interface between the GaAs and AlGaAs layers is reached, because most RIE reactor chambers are made of aluminum. The aluminum sputtered from the chamber walls during the RIE process essentially buries any such aluminum concentration change.

Additionally, the above-described prior art schemes are restricted to endpoint detection. They cannot be used to stop an etch process with a predetermined thickness remaining of the layer being etched, without resorting to etch timing, with its attendant inaccuracies.

Likewise, with reference to thickness increasing processes such as deposition, applicant is not aware of any monitoring apparatus or techniques which can be used to stop a deposition process after a thin layer of a first material has been deposited over a second material, without resorting to some form of deposition timing or wafer weighing step.

The invention as claimed is intended to remedy the above-described drawbacks in thickness-changing process monitoring.

The advantage offered by the present invention is that it allows accurate monitoring of a thickness-changing process. The invention permits the monitoring of the deposition of a very thin layer of material over a second different material. The invention permits the monitoring of material thickness reduction down to a very thin layer above a second different material. Finally, the invention permits the accurate monitoring of the etch-through from a first material to a second different material.

SUMMARY OF THE INVENTION

Briefly, the present invention comprises a method and an apparatus for monitoring a change of thickness of a first material layer having a first bandgap wavelength energy, with the first material layer for disposal over a second material layer on a wafer, wherein the second material layer has a second different bandgap wavelength energy and wherein at least one of the first and second materials has a direct bandgap. The apparatus comprises:

means for holding the wafer and for changing the thickness of the first material layer at a particular location over the second material layer;

means for generating a beam of energy of an intensity and wavelength sufficient to pump the at least one bandgap material layer with its direct bandgap wavelength energy to a higher energy state;

means for directing the beam of energy to impinge at an angle onto the surface and to penetrate said wafer at the location where the first material thickness is being changed; and means for detecting induced luminescence from the at least one direct bandgap material layer to determine when to stop the thickness changing means.

In a preferred embodiment of the present invention, the apparatus further includes means for varying the angle at which the beam of energy impinges onto the surface of the wafer, to thereby vary the depth to which the beam penetrates into the wafer.

In one embodiment of the present invention, the thickness changing means comprises means for depositing the first material layer onto the second material layer.

In a further embodiment of the present invention, the thickness changing means comprises means for reducing the thickness of an existing first material layer.

In yet another embodiment of the present invention, the energy beam generating means may include means for generating an energy beam that includes energy of an intensity and wavelength sufficient to pump the first material layer with a first direct bandgap wavelength energy to a higher energy state; and wherein the detecting means includes means for detecting the induced luminescence from the pumped first material layer.

In yet another embodiment of the present invention, the energy beam generating means may include means for generating an energy beam that includes energy of an intensity and a wavelength sufficient to pump the second material layer with a second direct bandgap wavelength energy to a higher energy state; and wherein the detecting means includes means for detecting the induced luminescence from the pumped second material layer.

In a further embodiment of the present invention, the detecting means may include means for changing the operation of the thickness reducing means a predetermined time after either the second material induced luminescence has been detected above a predetermined threshold, or after the first material induced luminescence is no longer detected above a predetermined threshold, or some combination of the two.

In one embodiment of the present invention, the first layer is GaAs, while the second material layer is AlGaAs.

The present invention further includes the method for monitoring a change in thickness of a first material layer with a first bandgap energy, with the first material layer for disposal over a second material layer formed on a wafer, with the second material layer having a second different bandgap energy, wherein at least one of the first and second materials has a direct bandgap.

BRIEF DESCRIPTION OF THE DRAWING

The Figure discloses one embodiment of the present invention.

DETAILED DESCRIPTION OF THE PREFERRED EMBODIMENT

The present invention discloses an apparatus and a method for monitoring a change of thickness of a first material layer having a first bandgap wavelength energy, with the first material layer for disposal over a second material layer on a wafer, which second material wafer has a second different bandgap wavelength energy, wherein at least one of the first and second materials has a direct bandgap. The present invention is based on the monitoring of laser-induced luminescence of this at least one direct bandgap material layer, either by itself, or in combination with the laser-induced luminescence of the other material layer. If both the first and second material layers have direct bandgaps, then their respective luminescence peaks must be separated in the optical spectrum.

In the context of the present invention, the phrase "thickness-changing" is meant to refer to apparatus and processes which both increase the thickness of a given layer to a desired thickness, and also to apparatus and processes which reduce the thickness of the desired layer to either a predetermined thickness or to zero thickness. The phrase "thickness-changing" thus encompasses a variety of processes including deposition, and etching and ion milling.

Referring now to the Figure, there is shown means 10 for holding a wafer 12 and for changing the thickness of a first material layer on the wafer at a particular location over a second material layer on the wafer, wherein at least one of these materials has a direct bandgap. Although there are a variety of thickness changing apparatus which may be utilized to implement the present invention, the invention will be discussed in the context of a reactive ion etching device, for ease of explanation. Accordingly, the thickness-changing means 10 comprises a reactive ion etching chamber 14, which includes an electrode 16 connected via line 18 to an external RF power supply 20. The wafer 12 to be etched is disposed on one surface of the electrode 16. A typical reactive ion etching apparatus of the type shown is described in 3rd International Symposium on Dry Etching, Cachan, France, December 1986.

In operation, the etching chamber 14 is typically pumped down to a vacuum equal to or less and than $5 \times 10^{-6}$ torr. The chamber 14 is then backfilled with a -gas-mixture appropriate to form a desired etching plasma for the layer on the wafer to be etched. By way of example, for a first layer of GaAs to be etched through to a second layer of AlGaAs disposed therebelow, a gas mixture of 18 m torr of $CCl_2F_2$ and 18 m torr of He is backfilled into the chamber 14. In the presence of a plasma discharge generated by the application of RF energy from the RF energy source 20, reactive species are generated from the backfilled gas. Portions of the first layer of GaAs are then removed by the chemical reaction between the reactive species and the GaAs, as well as by bombardment of the film by ions present in the plasma. The above-described reactive ion etching process is well known in the art.

In order to permit a monitoring of the change of thickness of the first material layer on the wafer 12, means 22 for generating a beam of energy of an intensity and wavelength sufficient to pump the at least one direct bandgap material layer to a higher energy state is provided. In a preferred embodiment, this beam generating means 22 is implemented by a laser which is disposed to direct its laser beam of energy to impinge at an angle onto the surface and to penetrate the wafer at a location where the first material layer thickness is being changed. By way of example, this angle of incidence may be set at 70° from the wafer horizontal. The chamber 14 includes a window 24, typically of quartz or glass, for permitting the transmission of the laser beam into the chamber and down onto the surface of the wafer 12. This laser beam from the laser 22 penetrates into the first material layer to a depth of between 200 Å and 1000 Å, depending on the incident angle of the laser. The precise penetration depth of the laser will be determined empirically. The energy of the laser beam is generally also set empirically. The energy should be typically at least one milliwatt, but should not be high enough to interfere with the etching process.

The operation of the invention will be discussed initially, with a direct bandgap second material. When the etching in the reactive ion etching chamber 14 has proceeded to the point where the laser beam of appropriate wavelength is penetrating down to the second material layer, then the laser beam acts to pump this second material layer to a higher energy state. Luminescence then occurs from this second material layer due to electron-hole recombination induced by laser excitation. Luminescence from this second material layer can be detected at first material thicknesses of between 200 Å and 1000 Å, depending on the incident angle of the laser, thus providing a measure of the first layer thickness that is remaining above the second material layer.

In order to detect this laser induced luminescence, means 30 for detecting the induced luminescence from the second material layer is provided in the Figure. This means 30 includes an optical detector 32, such as a photomultiplier, in combination with apparatus, such as the window 24 and the focusing lens 34, for transmitting the laser-induced luminescence from the chamber 14 to the detector 32. The detector 32 should be placed to avoid impingement thereon of the laser beam or its reflection. One detector that may be utilized to implement the present invention is RCA photodector model number C31034 with a GaAs cathode.

It can be seen that in order to make this form of laser induced luminescence viable, the first and second material layers must have different bandgap wavelength energies, and the at least one material layer must have a bandgap which is direct. In the present example of a first material of GaAs and a second material of AlGaAs, an incident laser wavelength between 6200 Å and 7000 Å is utilized to pump both the GaAs and the AlGaAs to respective higher energy states via the resonant effect resulting from the laser photon energy being close to the bandgap energy for GaAs. The bandgap difference between GaAs and AlGaAs is approximately 300 eV, depending on the aluminum concentration for the AlGaAs. Accordingly, the luminescence peaks for the GaAs and the AlGaAs in the optical spectrum are approximately 2000 Å apart, and thus easily differentiated. Note that for GaAs, the luminescence peak is on the order of 8000 angstroms, while for AlGaAs, the luminescence peak is on the order of 6200 Å.

It can be seen from the above that a wide variety of different first and second material layer combinations can be utilized with the present monitoring technique. However, it is essential that the second material layer have a bandgap which is different from the first material layer bandgap, and that at least one bandgap is direct. By way of example, the following material combinations would be operable with the present invention: InAlAs/GaAs; InPAlAs/GaAs; AlAs/GaAs; InP-GaAs/GaAs; $Al_xGa_{1-x}As$/GaAs; GaInAsP/InP. $In_{x-}Ga_{1-x}As$/GaAs; and GaInAsP/GaInAs.

In essence, almost any III-V semiconductors can be utilized as the direct bandgap material layer because these semiconductor materials have a direct bandgap between their valence and conduction bands. Note that these III-V semiconductor materials and their derivative ternary and quanternary compounds are of interest for the fabrication of both high-speed switching devices and optoelectronic elements such as lasers and detectors. Additionally, note that although silicon does not have a direct bandgap between its valence and conduction bands, it may be used as the other layer in the two layer combination.

There are a variety of other material in addition to the III-V semiconductors which may be utilized as the direct bandgap material. For example, $Cd Se_x S_{1-x}$/CdS and CuCl are prime candidates.

The present invention may be utilized to detect the occurrence of etch-through from a first layer to a second layer simply by monitoring the induced luminescence peak of the second material. When this induced luminescence peak is detected above a predetermined threshold, then the etch through to the second material layer has occurred. This predetermined threshold for the induced luminescence is set empirically. When this predetermined threshold for the induced luminescence has been reached, then the operation of the thickness reducing means 10 may be changed, either by turning it off or by changing one of the etch parameters.

It can be seen that a predetermined thin layer of the first material may be left over the second material layer by setting the predetermined luminescence threshold to detect the point when the first layer has been etched down to that predetermined thickness over the second material layer.

Alternatively, the predetermined threshold for the induced luminescence may be maintained constant, and the depth to which the laser beam penetrates may be changed by varying the incidence of the laser beam. In this instance, the induced luminescence at that predetermined threshold is detected when a prescribed thin layer of the first material remains over the second material layer. With respect to changing the angle of incidence of the laser, there are a wide variety of mechanical and optical apparatus available for accomplishing this angle of incidence change. For example, the laser beam may be directed to the wafer surface via a pirated mirror device 40. Device 40, in the example shown in the drawing, includes a mirror 42, which is disposed on a rotatable pivot 44. The pivot 44 may be adjusted automatically or manually to change the mirror angle, and thus the angle of incidence of the beam on to the wafer 12.

In a further embodiment of the present invention, a first material layer may be chosen to have a direct bandgap wavelength energy and the energy beam generating means 22 may include means for generating an energy beam that includes an energy of an intensity and wavelength sufficient to pump the first material layer direct bandgap. In this embodiment, the detecting means 32 then includes means for detecting induced luminescence from this pumped first material layer. The detecting means 32 may further include means for changing the operation of the thickness reducing means 10 a predetermined time after the first material induced luminescence is no longer detected above a predetermined threshold.

In yet a further embodiment of the present invention, the energy beam generating means 22 may include means for generating an energy beam that includes an energy of a sufficient intensity and wavelength to pump direct bandgaps for both the first and second material layers to higher respective energy states. For this embodiment, the detecting means then includes means for detecting the induced luminescence for both the first and second material layers. The detecting means may further include means for changing the operation of the thickness reducing means 10 a predetermined time after both the first material luminescence is no longer detected above a predetermined threshold and after the second material induced luminescence is first detected above a predetermined threshold.

As noted previously, the present invention is also applicable for monitoring thickness increasing processes for the first layer on the wafer. For example, for a wafer with only a second material layer, a first material layer can be deposited until the induced luminescence from the second material layer is no longer detectable above a predetermined threshold. The thickness of the first layer through which this second material layer induced luminescence will be detectable can be varied simply by changing the penetration depth of the laser into the wafer surface. This penetration depth can be varied, as noted previously, by varying the angle of incidence of the laser beam. Accordingly, precise, very thin layers of a first material can be applied over the second material layer utilizing the disclosed apparatus and method of the present invention.

The present invention further comprises the method for monitoring a change in thickness of a first material layer with a first bandgap energy with the first material layer for disposal over a second material layer on a wafer and having a second different bandgap energy, wherein at least one of the materials has a direct bandgap. This method includes the steps of:
 changing the thickness of the first material layer having the first bandgap energy at a particular location over the second material layer;
 generating a beam of energy of an intensity and a wavelength sufficient to pump the at least one direct bandgap material layer to a higher energy state;
 directing the beam of energy to impinge at an angle onto the surface and to penetrate the wafer at the location where the first material thickness is being changed; and
 detecting induced luminescence from the at least one direct bandgap material layer to determine when to stop the thickness changing step.

It should be noted that although the present invention has been disclosed in the context of a single electrode reactive ion etching chamber, other chamber configurations can be utilized. The transmission of the laser beam and the transmission of the induced luminescence to the detector can also be accomplished by optical fibers disposed in the chamber.

It should be further noted that the energy beam directing means 22 may be implemented by one or more lasers, depending on the number of wavelengths or the size of the bandwidth that is required for pumping the respective materials on the wafer.

It may be desirable or necessary to increase the intensity of the direct bandgap pumped luminescence. This intensity increase can be accomplished by (1) more closely matching the laser pumping frequencies to the bandgap difference of the one or more materials that are to be pumped; (2) or by increasing the wafer area on which the pumping laser beam impinges; (3) or simply by increasing the pumping laser intensity. A typical set of optics that may be used to vary the size of the laser beam, and thus the area of impingement, is shown in FIG. 5 of the article "Optical Gain In Semiconductors" by Shaklee, Nahory, and Leheny, *Journal of Luminescence* 7, (1973) 284–309, North-Holland Publishing Company. However, it should be noted that only a small luminescence signal is generally required to accomplish the monitoring of the present invention, and too large a laser pump signal may disturb the etching process.

In order to improve the detection of the generated luminescence in the presence of standard plasma emissions, it may be desirable to add a modulation to the laser beam, for example, by chopping the beam at a predetermined frequency. A phase detector would then be utilized at the detector 32 to detect the modulated luminescence.

While the present invention has been particularly shown and described with reference to preferred embodiments therefor, it will be understood by those skilled in the art that the foregoing and other changes in form and detail may be made therein without departing from the spirit and the scope of the present invention, as defined in the appended claims.

I claim:

1. An apparatus for monitoring a change of thickness of a first material layer having a first bandgap wavelength energy, said first material layer for disposal over a second material layer on a wafer and having a second different bandgap wavelength energy, wherein at least one of said materials has a direct bandgap, comprising:
 means for holding said wafer and for changing the thickness of said first material layer at a particular location over said second material layer;
 means for generating a beam of energy of an intensity and wavelength sufficient to pump said at least one direct bandgap material to a higher energy state;
 means for directing said beam of energy to impinge at an angle on to the surface and to penetrate said wafer at said location wherein said first material layer thickness is being changed; and
 means for detecting induced luminescence from said at least one direct bandgap material layer to determine when to stop said thickness changing means.

2. An apparatus as defined in claim 1, wherein said detecting means includes means for detecting induced luminescence from a direct bandgap second material; and further comprising
 means for varying the second material induced luminescence detection capability through said first material layer.

3. An apparatus as defined in claim 1, wherein said detecting means includes means for detecting induced luminescence from a direct bandgap second material; and further including means for varying the angle at which said beam of energy impinges on the surface of said wafer to thereby vary the depth to which said beam penetrates into said wafer.

4. An apparatus as defined in claim 1, wherein said thickness changing means comprises means for depositing said first material layer on to said second material layer.

5. An apparatus as defined in claim 4, wherein said detecting means includes means for detecting induced luminescence from a direct bandgap second material; and further comprising
 means for varying the second material induced luminescence detection capability through said first material layer.

6. An apparatus as defined in claim 4, wherein said detecting means includes means for detecting induced luminescence from a direct bandgap second material;

and further including means for varying the angle at which said beam of energy impinges on the surface of said wafer to thereby vary the depth to which said beam penetrates into said wafer.

7. An apparatus as defined in claim 1, wherein said thickness changing means comprises means for reducing the thickness of an existing first material layer.

8. An apparatus as defined in claim 7, wherein said detecting means includes means for detecting induced luminescence from a direct bandgap second material; and further comprising
means for varying the second material induced luminescence detection capability through said first material layer.

9. An apparatus as defined in claim 7, wherein said detecting means includes means for detecting induced luminescence from a direct bandgap second material; and
further including means for varying the angle at which said beam of energy impinges on the surface of said wafer to thereby vary the depth to which said beam penetrates into said wafer 10. An apparatus as defined in claim 1, wherein said energy beam generating means includes means for generating an energy beam that includes energy of an intensity and wavelength sufficient to pump said first material layer with a first direct bandgap wavelength energy to a higher energy state; and
wherein said detecting means includes means for detecting induced luminescence from said pumped first material layer.

11. An apparatus as defined in claim 7, wherein said energy beam generating means includes means for generating an energy beam that includes energy of an intensity and wavelength sufficient to pump said first material layer with a first direct bandgap wavelength energy to a higher energy state; and
wherein said detecting means includes means for detecting induced luminescence from said pumped first material layer.

12. An apparatus as defined in claim 11, wherein said detecting means further includes means for changing the operation of said thickness reducing means a predetermined time after said first material induced luminescence is no longer detected above a predetermined threshold.

13. An apparatus as defined in claim 11, wherein said energy beam generating means includes means for generating an energy beam of an intensity and wavelength sufficient to pump a direct bandgap second material layer to a higher energy state; and
wherein said detecting means includes means for detecting induced luminescence from said pumped second material layer.

14. An apparatus as defined in claim 13, wherein said detecting means further includes means for changing the operation of said thickness reducing means a predetermined time after both said first material luminescence is no longer detected above a predetermined threshold and said second material induced luminescence is first detected above a predetermined threshold.

15. An apparatus as defined in claim 1, wherein said energy beam generating means includes means for generating an energy beam of an intensity and wavelength sufficient to pump a direct bandgap second material layer to a higher energy state; and
wherein said detecting means includes means for detecting induced luminescence from said pumped second material layer.

16. An apparatus as defined in claim 4, wherein said energy beam generating means includes means for generating an energy beam of an intensity and wavelength sufficient to pump a direct bandgap second material layer to a higher energy state; and
wherein said detecting means includes means for detecting induced luminescence from said pumped second material layer.

17. An apparatus as defined in claim 7, wherein said energy beam generating means includes means for generating an energy beam of an intensity and wavelength sufficient to pump a direct bandgap second material layer to a higher energy state; and
wherein said detecting means includes means for detecting induced luminescence from said pumped second material layer.

18. An apparatus as defined in claim 17, wherein said detecting means further includes means for changing the operation of said thickness reducing means a predetermined time after said second material induced luminescence is first detected above a predetermined threshold.

19. An apparatus as defined in claim 18, including means for varying the angle at which said beam of energy impinges on the surface of said wafer to thereby vary the depth to which said beam penetrates into said wafer.

20. An apparatus as defined in claim 7, wherein said thickness reducing means comprises means for reactive ion etching said wafer.

21. An apparatus as defined in claim 1, wherein said energy beam generating means includes means for generating said energy beam to include energy of an intensity and wavelength sufficient to pump a material layer of AlGaAs to a higher energy level; and
wherein said detecting means includes means for detecting induced luminescence from said pumped AlGaAs.

22. An apparatus as defined in claim 1, wherein said energy beam generating means further comprises means for generating an energy beam that includes energy of an intensity and wavelength sufficient to pump a direct bandgap for GaAs to a higher energy level; and
wherein said detecting means includes means for detecting induced luminescence from said pumped GaAs.

23. An apparatus as defined in claim 22, wherein said energy beam generating means includes means for generating said energy beam to include energy of an intensity and wavelength to pump a material layer of AlGaAs to a higher energy level; and
wherein said detecting means includes means for detecting induced luminescence from said pumped AlGaAs.

24. An apparatus as defined in claim 1, wherein said energy beam generating means comprises means for generating an energy beam of an intensity and with wavelengths sufficient to pump first and second direct bandgaps of first and second material layers, respectively, wherein both of said material layers are III-V semiconductor compounds.

25. A method for monitoring a change in thickness of a first material layer with a first bandgap energy, said first material layer for disposal over a second material layer formed on a wafer, with said second material layer having a different bandgap energy, wherein at least one of said material bandgaps is a direct bandgap, comprising the steps of:
- changing the thickness of said first material layer having said first bandgap energy at a particular location over said second material layer;
- generating a beam of energy of an intensity and wavelength sufficient to pump said at least one direct bandgap material layer to a higher energy state;
- directing said beam of energy to impinge at an angle on to the surface and to penetrate said wafer at said location where said first material thickness is being changed; and
- detecting induced luminescence from said at least one direct bandgap material layer to determine when to alter said thickness changing step.

26. A method as defined in claim 25, further including the step of
- varying the angle at which said beam of energy impinges on the surface of said wafer to thereby vary the depth to which said beam penetrates.

27. A method as defined in claim 25, wherein said thickness changing step comprises the step of depositing said first material layer on to said second material layer.

28. A method as defined in claim 27, further including the step of
- varying the angle at which said beam of energy impinges on the surface of said wafer to thereby vary the depth to which said beam penetrates into said wafer.

29. A method as defined in claim 27, wherein said beam generating step comprises the step of generating a beam with an energy and a wavelength sufficient to pump a direct bandgap second material to a higher energy state; and
- wherein said detecting step includes the step of detecting induced luminescence from said second material; and
- wherein said detecting step further includes the step of changing a depositing parameter in said depositing step a predetermined time after said second material induced luminescence drops below a predetermined threshold.

30. A method as defined in claim 25, wherein said thickness changing step comprises the step of reducing the thickness of an already present first material layer.

31. A method as defined in claim 30, further including the step of
- varying the angle at which said beam of energy impinges on the surface of said wafer to thereby vary the depth to which said beam penetrates.

32. A method as defined in claim 30, wherein said beam generating step includes the step of generating an energy beam of an intensity and wavelength sufficient to pump a direct bandgap second material layer to a higher energy state; and
- wherein said detecting step includes the step of detecting induced luminescence from said pumped second material layer.

33. A method as defined in claim 32, wherein said detecting step includes the step of changing a thickness reducing parameter in said thickness reducing step a predetermined time after said second material induced luminescence is first detected above a predetermined threshold.

34. A method as defined in claim 32, wherein said beam generating step includes the step of generating an energy beam with an energy and a wavelength sufficient to pump a direct bandgap first material layer to a higher energy state; and
- wherein said detecting step further includes the step of detecting induced luminescence from said pumped first material.

35. A method as defined in claim 34, wherein said detecting step includes the step of changing a thickness reducing parameter in said thickness reducing step a predetermined time after said first material luminescence is no longer detected above a predetermined threshold and said second material induced luminescence is detected above a predetermined threshold.

36. A method as defined in claim 30, wherein said thickness reducing step comprises the step of reactive ion etching said wafer.

37. A method as defined in claim 25, wherein said energy beam generating step comprises the step of generating an energy beam with an energy and a wavelength sufficient to pump AlGaAs to a higher energy state; and
- wherein said detecting step includes the step of detecting induced luminescence from said pumped AlGaAs.

38. A method as defined in claim 25, wherein said energy beam generating step comprises the step of generating an energy beam with an energy and a wavelength sufficient to pump GaAs to a higher energy state; and
- wherein said detecting step further includes the step of detecting induced luminescence from said pumped GaAs.

39. A method as defined in claim 25, wherein said energy beam generating step includes the step of generating said energy beam with an energy and wavelengths sufficient to pump GaAs and AlGaAs to higher energy states; and
- wherein said detecting step includes the step of monitoring induced luminescence wavelength peaks for each of said pumped GaAs and AlGaAs.

* * * * *